United States Patent [19]
Fulkerson

[11] 4,390,077
[45] Jun. 28, 1983

[54] APPARATUS HAVING PUSH/PULL ACTUATED BOOM FOR GENERATING WAVES IN THE GROUND

[76] Inventor: Earl Fulkerson, 4111 9th St. East, Bradenton, Fla. 33508

[21] Appl. No.: 198,530

[22] Filed: Oct. 20, 1980

Related U.S. Application Data

[63] Continuation-in-part of Ser. No. 112,394, Jan. 15, 1980, Pat. No. 4,291,780, and Ser. No. 11,875, Feb. 13, 1979, Pat. No. 4,244,437.

[51] Int. Cl.³ ............................................. G01V 1/147
[52] U.S. Cl. ................................... 181/121; 181/114; 181/401
[58] Field of Search ................... 181/114, 121, 401; 367/75; 404/133, 90

[56] References Cited

U.S. PATENT DOCUMENTS

| | | | |
|---|---|---|---|
| 2,659,583 | 11/1953 | Dorkins | 404/133 X |
| 2,659,584 | 11/1953 | Dorkins | 404/133 X |
| 3,393,763 | 7/1968 | Sundt | 181/114 |
| 4,108,270 | 8/1978 | Mifsud | 181/114 |

Primary Examiner—Maynard R. Wilbur
Assistant Examiner—K. R. Kaiser
Attorney, Agent, or Firm—Charles W. Chandler

[57] ABSTRACT

A mobile generator for producing waves for seismic exploration. A hammer, mounted on an elongated boom, is dropped to strike an anvil embedded in the ground to create a ground wave. The boom is pivotal between positions selected according to the nature of the wave to be created. A pair of hydraulic piston actuators move the boom between its selected positions. A tensioning device is connected to the cable which drops the hammer in such a manner as to prevent the hammer from rebounding after an impact.

4 Claims, 8 Drawing Figures

APPARATUS HAVING PUSH/PULL ACTUATED BOOM FOR GENERATING WAVES IN THE GROUND

CROSS-REFERENCE TO RELATED APPLICATIONS

This application is a continuation-in-part of my co-pending application Ser. No. 11,875 having a filing date of Feb. 13, 1979 and issued Jan. 13, 1981 as U.S. Pat. No. 4,244,437 and Ser. No. 112,394 having a filing date of Jan. 15, 1980 and issued Sept. 29, 1981 as U.S. Pat. No. 4,291,780.

BACKGROUND OF THE INVENTION

Seismic wave generators are useful for determining the details of underground structure for a variety of useful purposes. In my aforementioned co-pending applications, a novel mobile generator was disclosed having a boom that can be pivoted between selected positions. A hammer, carried on the boom, is dropped to strike an anvil positioned on the ground. The nature of the wave generated depends upon the angle of the boom with respect to the ground.

SUMMARY OF THE INVENTION

The broad purpose of the present invention is to provide an improved mobile seismic wave generator of the type in which a hammer is dropped for motion along a boom to strike an anvil mounted on the ground, the boom being pivotally movable by a pair of hydraulic actuators.

Another object of the invention is to provide such an apparatus in which a second pair of hydraulic actuators are connected to the anvil for pushing it to a firm position in the ground, or raising it when the apparatus is being relocated.

Still another object of the invention is to provide means for locking the boom in position to prevent it from being accidentally pivoted as the entire mobile generator is being relocated, and for connecting the hammer to the boom to prevent it from being accidentally dropped.

Still another object of the invention is to provide tensioning means connected to the cable which raises the hammer such that when the hammer is dropped, the cable is sufficiently taut immediately upon impact to prevent the hammer from rebounding on the anvil.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
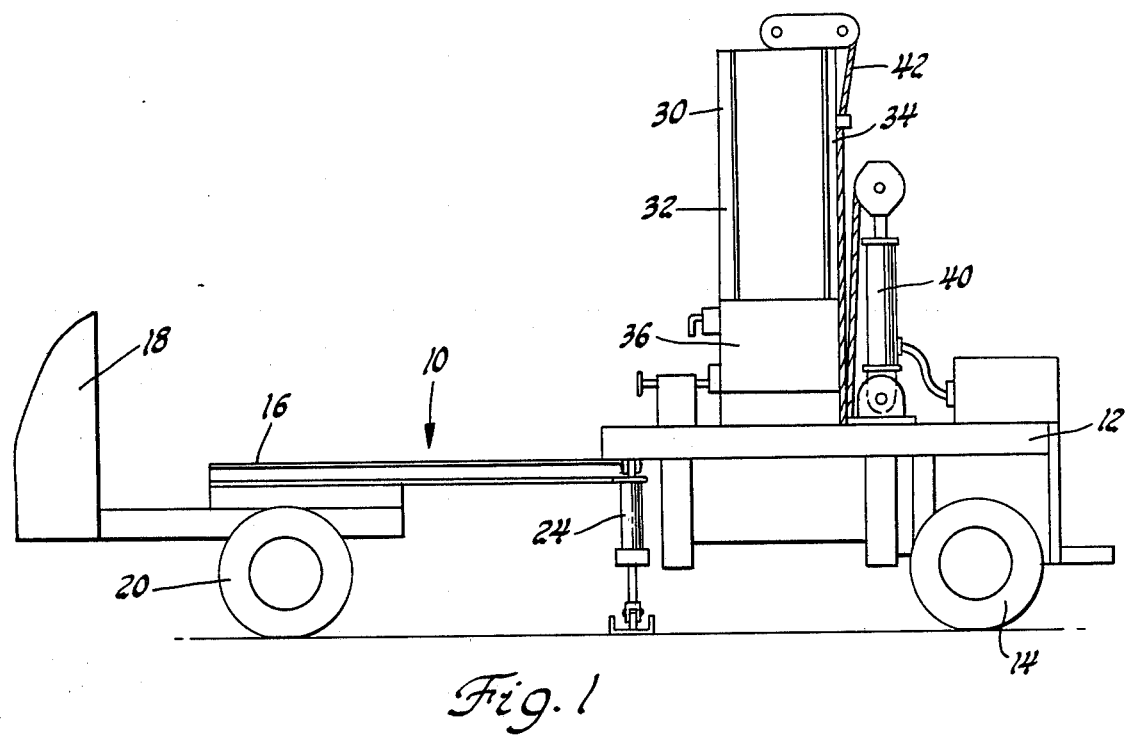
FIG. 1 is a side elevational view showing a preferred seismic wave generator.

Referring to the drawings, FIG. 1 illustrates a trailer, generally indicated at 10, having a four-sided frame 12, mounted on ground-engaging wheel means 14. A tongue 16, carried on the forward end of the frame, is connected to a tractor 18 having ground-engaging means 20. Wheel means 14 and 20 support frame 12 for the generation of a seismic wave. A pair of spaced hydraulic piston means 24, (only one shown) are carried on frame 12 and have their upper ends pivotally connected to the frame so that the feet can be spaced from the frame to brace it against sidewise motion. The piston means are also useful when the wheels are mired in soft ground.

Boom means 30 are mounted on the frame and include a pair of spaced, parallel legs 32 and 34 supporting a weight 36 for slidable motion. A hammer 38 is carried below the weight.

Hydraulic power means 40 are mounted on the frame and connected to a cable 42 which is also connected to the weight for raising it and the hammer toward the upper end of the boom.

Figure 2:
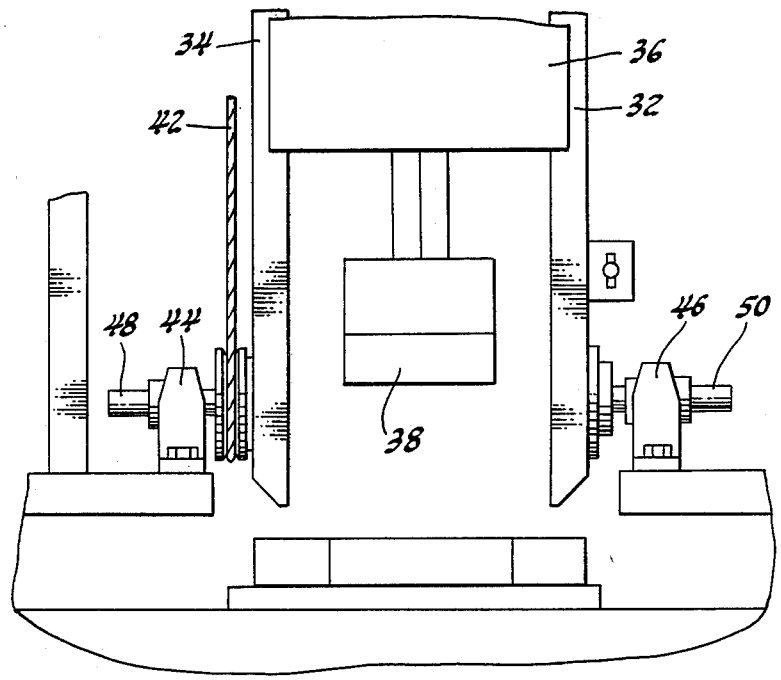
FIG. 2 is a fragmentary view illustrating the boom and its relationship to the hammer and the anvil.

Referring to FIG. 2, a pair of bearings 44 and 46 are mounted on the frame and support a pair of aligned shafts 48 and 50. The lower end of boom legs 32 and 34 are mounted on shafts 48 and 50, respectively, so that the boom can be pivoted about the shafts.

Figure 4:
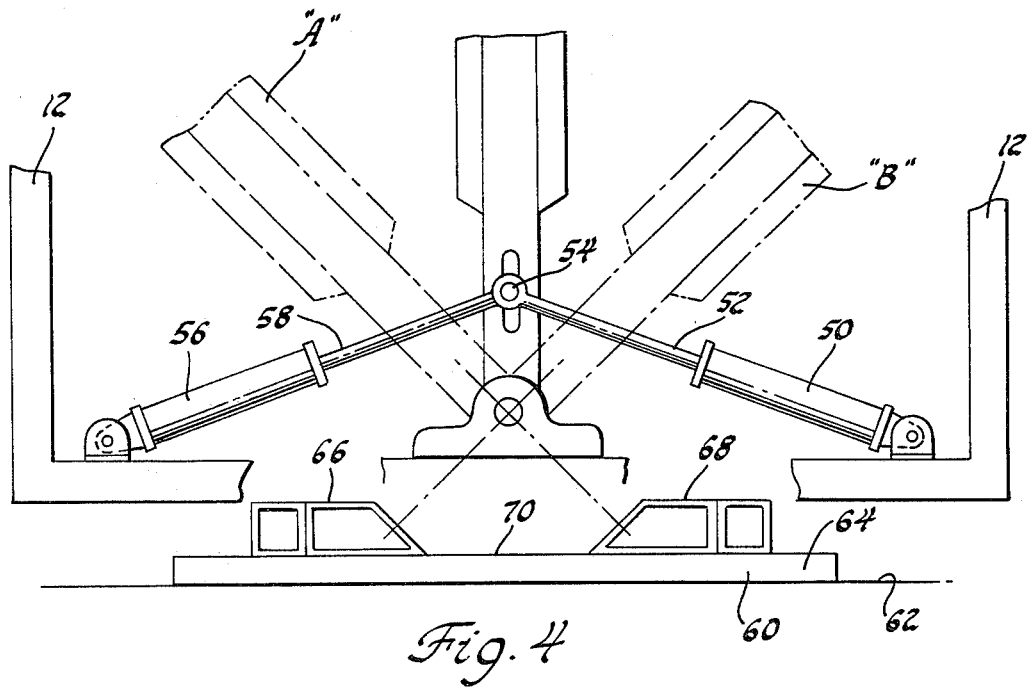
FIG. 4 is a fragmentary elevational view of the boom and the anvil showing the manner in which the boom is tilted.
Figure 5:
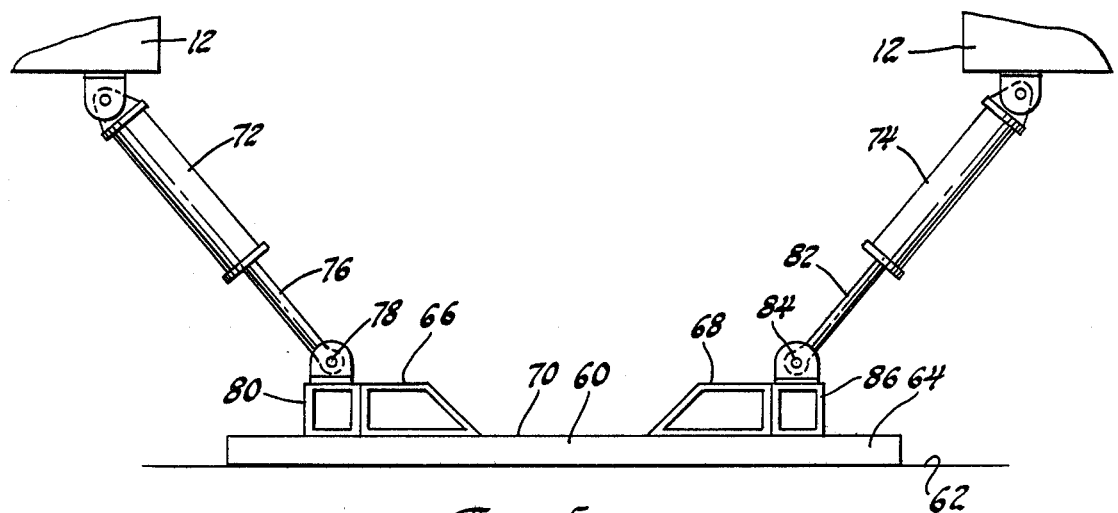
FIG. 5 is a view of the anvil showing the actuator for urging it into a firm position in the ground.

Referring to FIG. 4, boom 30 is pivotal from an upright position illustrated at "A" in which it is generally 45° with respect to the ground, to a similar angular position on the opposite side of the frame at "B". A hydraulic actuator 50 has one end connected to frame 12 and a piston 52 connected to a pin 54 carried on boom 30 so that by extending or retracting the piston rod, the boom can be moved either toward or away from position "A".

A second hydraulic actuator 56 is connected to the opposite side of the frame and has a piston rod 58 connected to pin 54 to cooperate with actuator 50 in moving the boom from position "A" toward position "B". Thus while piston rod 52 is pushing the boom, piston rod 58 is pulling it toward position "A". To move it toward the opposite position, piston rod 52 pulls the boom while piston rod 58 pushes it to position "B". The two actuators cooperate in moving the boom toward an intermediate vertical position.

An anvil 60 is disposed on ground 62 beneath frame 12. Anvil 60 includes a plate 64. An impact-receiving structure 66 is attached to plate 64 and has an impact-receiving surface disposed at 45° with respect to the plate. A second impact-receiving structure 68 is attached to the plate and has an impact receiving surface disposed at 90° with respect to the impact-receiving surface of structure 64 and at a 45° angle with respect to the plate. The two impact-receiving structures are spaced on opposite sides of a midsection 70 which provides a third impact-receiving surface when the boom is disposed in its vertical position. The boom is supported such that it can be pivoted to a perpendicular position with respect to each of the three impact-receiving surfaces.

Figure 3:
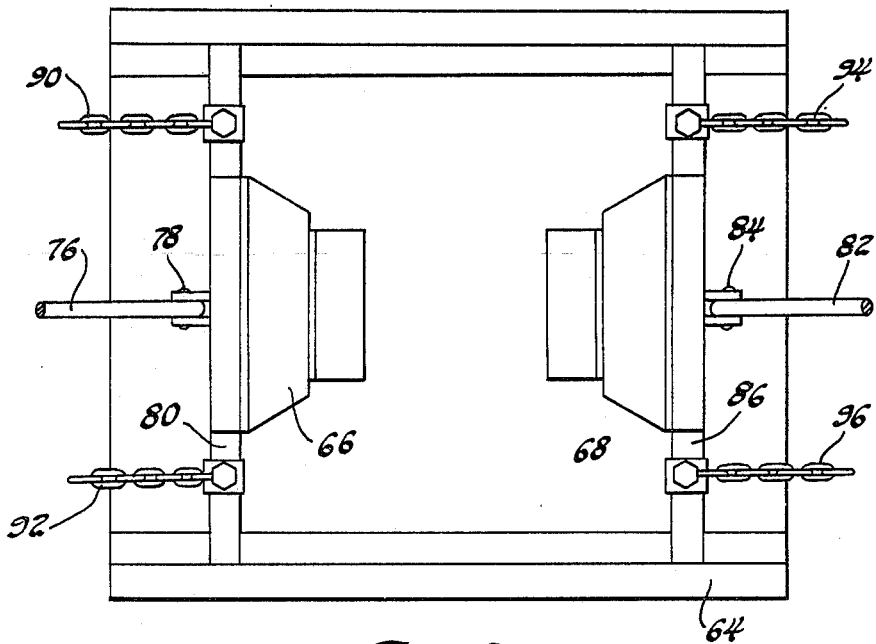
FIG. 3 is a plan view of the anvil.

A pair of hydraulic actuators 72 and 74 are connected to the frame above anvil 60, on opposite sides of the boom. Actuator 72 has a piston rod 76 connected by means 78 to a channel 80 attached to plate 64. Similarly, actuator 74 has a piston rod 82 connected by means 84 to a channel 86 attached to plate 64. Referring to FIG. 3, the lower ends of piston rods 76 and 82 are connected to the midsection of channels 80 and 86 for providing a downward pressure on the anvil plate by applying a major portion of the weight of the apparatus on the plate. The two actuators are inclined with respect to the plate to prevent it from slipping sideways when the anvil is being struck at an angle.

Figure 6:
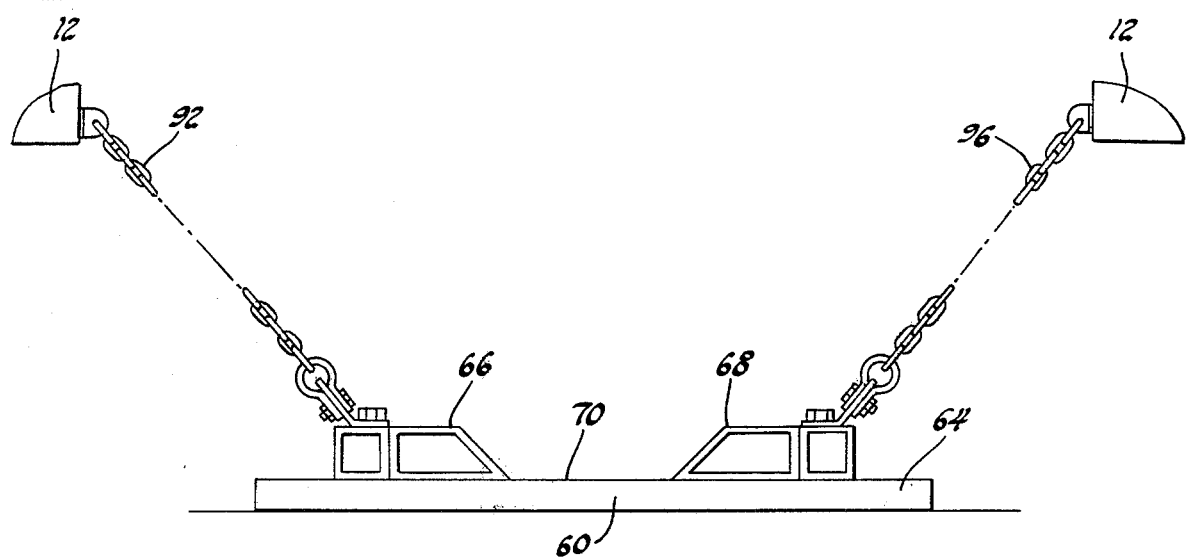
FIG. 6 is a view showing the manner in which the anvil is raised above the ground and supported by safety chains.

Referring to FIGS. 3 and 6, when the apparatus is being transported, actuators 72 and 74 are employed to raise the anvil plate above the ground, as illustrated in FIG. 6. Chain means 90, 92, 94, and 96, are connected on opposite sides of the anvil plate in its raised position. As illustrated in FIG. 6, the upper ends of the chains are connected to frame 12, a suitable height above the ground. The chains provide a safety feature for insuring that the anvil is not dropped in the event of actuator failure. Preferably the anvil is raised about six inches above the ground when the mobile generator is being relocated.

Figure 8:
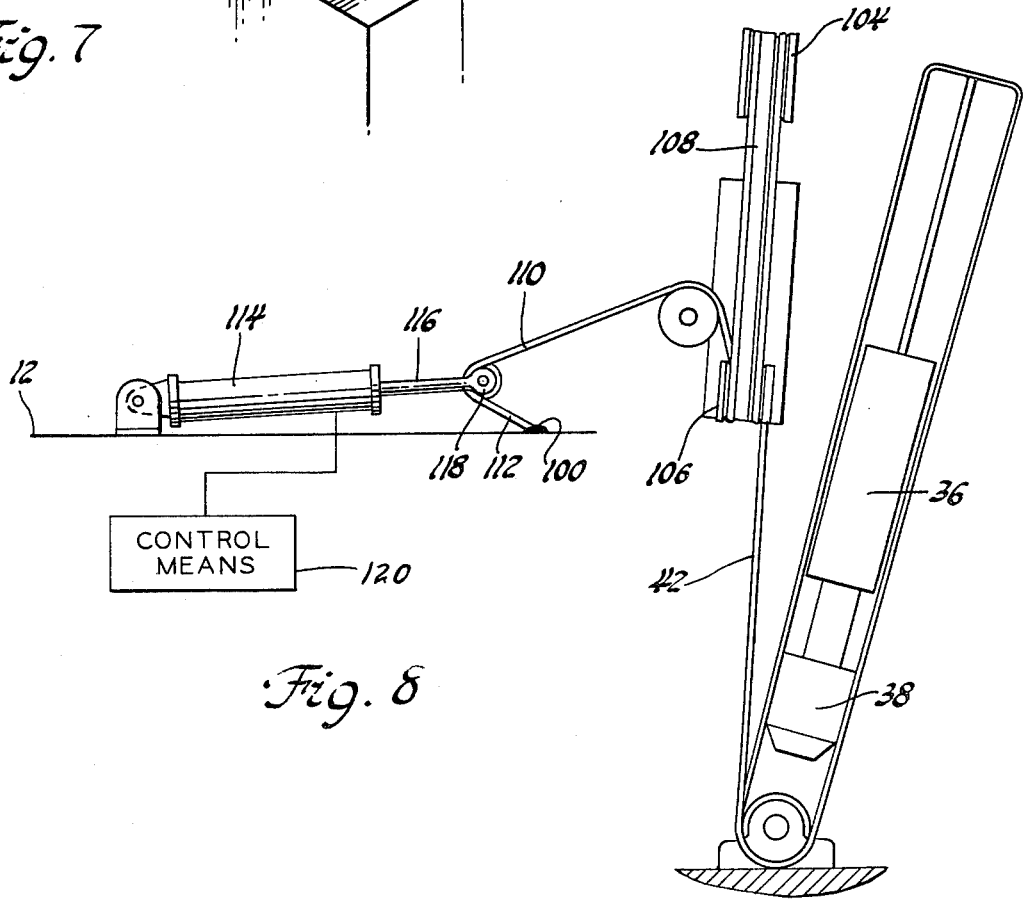
FIG. 8 is a schematic view illustrating the tensioning means for maintaining the cable in a taut position.

Referring to FIGS. 2 and 8, one end of cable 42 is attached to the top of frame 12. The opposite end of cable 42 is connected to the upper end of weight 36. The intermediate portion of the cable is connected around pulley means 104 and 106 in such a manner that when hydraulic power means 40 extends piston rod 108, the hammer is raised. When piston rod 108 is retracted, the cable develops enough slack to permit the hammer to drop toward the anvil. The cable is arranged such that a doubled section 110 and 112 is disposed adjacent connection 100. An actuator 114 has a piston rod 116 supporting pulley 118 so that the doubled sections 110 and 112 are wrapped around pulley 118. The arrangement is such that actuator 114 is operative to apply a tension on the cable to absorb any cable slack. Control means 120 are connected to actuator 114 to apply an upward bias on the hammer sufficient to lift the hammer a fraction of an inch off the anvil at the bottom of the hammers downward strike. This adjustment is made before the user applies a power stroke and prevents the hammer from rebounding on the anvil and causing unwanted vibrations in the ground.

Figure 7:
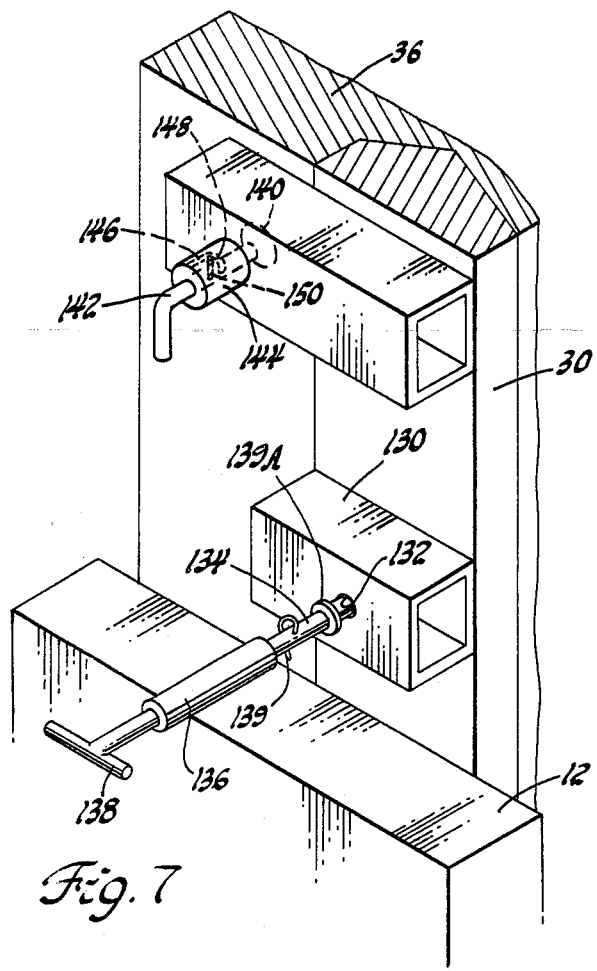
FIG. 7 is an enlarged view showing the means for locking the boom and the hammer against accidental motion.

Referring to FIG. 7, boom leg 30 carries a channel 130 having an opening 132. A pin 134 is mounted on a support 136 carried on frame 12. A handle 138 carried on the pin permits the user to insert the pin into opening 132 when the boom is in its vertical position. A keeper 139 is inserted by the user into an opening in the pin when it is fully inserted. A washer 139A is attached to the pin to limit its movement toward its release position in which the pin is removed from opening 132. Pin 134 thus prevents the boom from being accidentally pivoted when the apparatus is being relocated.

Weight 36 has an opening 140, illustrated in phantom in FIG. 7. A second pin 142 is carried on support 144 which is attached to boom leg 30. Support 144 has an internal slot 146 that extends parallel to the pin, and an arcuate, second slot 148 connected to slot 146. A pin 150 is carried on pin 142 so as to be movable in slots 146 and 148. Pin 142 is inserted into opening 140 until pin 150 abuts the end of slot 146, to lock weight 36 such that it cannot be accidentally dropped while the apparatus is being relocated. The user then rotates pin 142 until pin 150 abuts the end of slot 148. To release the weight, the motion of pin 142 is reversed. Preferably both supports 144 and 130 are painted red to advise the user of these safety features.

Thus it is to be understood that I have described an improved seismic wave generator having safety means in the form of chains for supporting the anvil in a raised position, means for locking the boom in its upright position, another locking means for locking the hammer to the boom to prevent it from being inadvertently dropped and a means for applying a tension on the cable to prevent a rebound wave from being generated.

Having described my invention, I claim:

1. Apparatus for generating waves in the ground comprising:
   a frame;
   an elongated, linear, rigid boom movably mounted on the frame in a first boom position;
   a hammer mounted on the boom for movement therealong;
   means mounted on the boom and connected to the hammer for raising it to a first elevated position, and for dropping it from said first elevated position;
   an anvil having a first impact surface and a second impact surface, the anvil being mounted on the ground beneath the frame in a position such that the first impact surface is aligned with the path of motion of the hammer as it is being dropped from said first elevated position, the second impact surface being spaced from the first impact surface;
   positioning means mounted on the frame and connected to the boom for pivoting it from said first boom position to a second boom position to guide the hammer for a downward motion from a second elevated position toward the anvil to strike the second impact surface, the second elevated position of the hammer being horizontally spaced from said first elevated position;
   whereby the hammer is operative to generate a wave in the ground by a downward motion from either said first elevated position or said second elevated position without repositioning either the frame or the anvil with respect to the ground.

2. Apparatus for generating waves in the ground comprising:
   a frame;
   an elongated, linear, rigid boom movably mounted on the frame;
   a hammer mounted in an elevated position on the boom for movement therealong;
   an anvil mounted on the ground beneath the frame in a position to be struck by the hammer;
   first hydraulic means mounted on the boom, and a cable connected between the first hydraulic means and the hammer for dropping it from said elevated position in a substantially free-falling motion to strike the anvil whereby the hammer is operative to generate a wave in the ground by a downward motion as it engages the anvil;
   said first hydraulic means being operative for raising the hammer to said elevated position; and
   hydraulically-actuated tension means connected to the cable for maintaining it in a taut position as the hammer is moving with respect to the boom to prevent the hammer from rebounding after it has engaged the anvil.

3. Apparatus as defined in claim 2, in which said hydraulically actuated tension means comprises a second hydraulic cylinder mounted on the frame, a piston slideably carried by the second hydraulic cylinder, the piston having a rod, and the cable has a doubled portion connected to the end of the piston rod to apply a tension on the cable to absorb any cable slack as the hammer engages the anvil.

4. Apparatus as defined in claim 3, in which the tension means is adapted to lift the hammer a fraction of an inch off the anvil at the bottom of the hammer's downward motion.

* * * * *